US012519204B2

(12) United States Patent
Xu et al.

(10) Patent No.: US 12,519,204 B2
(45) Date of Patent: Jan. 6, 2026

(54) ELECTRONIC DEVICE

(71) Applicant: Lenovo (Beijing) Limited, Beijing (CN)

(72) Inventors: Yuling Xu, Beijing (CN); Dafei Mo, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 106 days.

(21) Appl. No.: 18/524,830

(22) Filed: Nov. 30, 2023

(65) Prior Publication Data

US 2024/0178546 A1 May 30, 2024

(30) Foreign Application Priority Data

Nov. 30, 2022 (CN) ......................... 202211524409.4

(51) Int. Cl.

| | |
|---|---|
| ***H01Q 1/22*** | (2006.01) |
| ***H01Q 1/24*** | (2006.01) |
| ***H01Q 1/48*** | (2006.01) |
| ***H01Q 21/30*** | (2006.01) |

(52) U.S. Cl.

CPC ................ *H01Q 1/22* (2013.01); *H01Q 1/48* (2013.01); *H01Q 21/30* (2013.01)

(58) Field of Classification Search

CPC .......... H01Q 1/22; H01Q 1/2266; H01Q 1/24; H01Q 1/243; H01Q 1/36; H01Q 1/42; H01Q 1/48; H01Q 1/50; H01Q 21/28; H01Q 21/30

See application file for complete search history.

(56) References Cited

FOREIGN PATENT DOCUMENTS

CN 113594682 A * 11/2021 ............... H01Q 1/36

* cited by examiner

*Primary Examiner* — Hoang V Nguyen

(74) *Attorney, Agent, or Firm* — ANOVA LAW GROUP, PLLC

(57) ABSTRACT

An electronic device includes a shell forming an accommodation space. The shell includes a first wall including a first opening communicating with the accommodation space. At least a part of the first wall located at the first opening forms a first antenna radiator of the electronic device.

20 Claims, 7 Drawing Sheets

ELECTRONIC DEVICE

CROSS-REFERENCE TO RELATED APPLICATION

The present disclosure claims priority to Chinese Patent Application No. 202211524409.4, filed on Nov. 30, 2022, the entire content of which is incorporated herein by reference.

TECHNICAL FIELD

The present disclosure relates to an electronic device.

BACKGROUND

An electronic device is a broadly used device. However, an antenna radiator of the current electronic device has a single form and poor adaptability.

SUMMARY

According to a first aspect of the present invention, there is provided an electronic device. The device includes a shell forming an accommodation space. The shell includes a first wall including a first opening communicating with the accommodation space. At least a part of the first wall located at the first opening forms a first antenna radiator of the electronic device.

Figure 1:
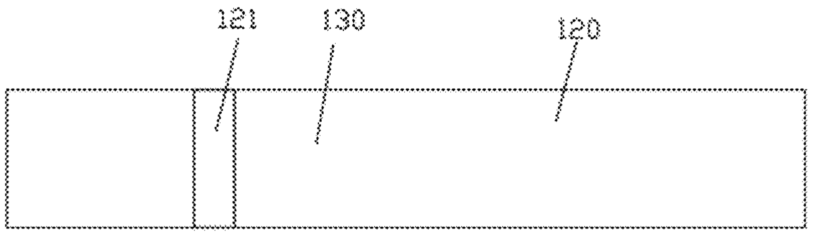
FIG. 1 illustrates a schematic local structural diagram of an electronic device according to some embodiments of the present disclosure.

| Reference numerals: | |
|---|---|
| 100 | Shell |
| 101 | Accommodation space |
| 102 | First part of accommodation space |
| 110 | Second wall |
| 111 | Through-hole |
| 120 | First wall |
| 121 | First opening |
| 122 | Second opening |
| 123 | First end of first wall |
| 130 | First antenna radiator |
| 131 | First part of first antenna radiator |
| 132 | Second part of first antenna radiator |
| 140 | Third antenna radiator |
| 141 | Second feed interface |
| 150 | Third wall |
| 160 | Fourth wall |
| 161 | Slot |
| 170 | First antenna feed wire |
| 171 | First feed interface |
| 180 | Ground wire |
| 181 | Ground interface |

DETAILED DESCRIPTION OF THE EMBODIMENTS

The technical solution of the present disclosure is described in detail below in connection with the accompanying drawings and embodiments of the present disclosure.

In embodiments of the present disclosure, unless otherwise specified and limited, the term "connection" should be broadly understood. For example, the connection can be an electrical connection, an internal connection of two elements, a direct connection, or an indirect connection through an intermediate medium. For those of ordinary skill in the art, the term can be understood according to an actual situation.

The terms "first/second/third" mentioned in embodiments of the present disclosure are only used to distinguish similar objects and do not represent a specific order for the objects. A specific order or sequence of "first/second/third" can be interchanged in an allowable manner. The objects distinguished by "first/second/third" can be interchanged in appropriate situations. Thus, embodiments of the present disclosure can be implemented in an order other than the order shown or described here.

An electronic device of embodiments of the present disclosure is described in detail in conjunction with FIGS. 1 to 14.

The electronic device includes a shell 100. The shell 100 forms an accommodation space 101. The shell 100 includes a first wall 120. The first wall 120 includes a first opening 121 that communicates with a through-hole 111. At least a part of the first wall 120 located at the first opening 121 forms a first antenna radiator 130 of the electronic device. Thus, the first antenna radiator 130 of the electronic device can be formed through the first wall 120 of the shell 100, and the first antenna radiator 130 may not need to be separately arranged. Thus, the structure of the electronic device for arranging the first antenna radiator 130 can be simplified, which improves the adaptability of the electronic device.

In embodiments of the present disclosure, the structure of the electronic device is not limited. For example, the electronic device can be a cell phone, a tablet, or a laptop.

The structure of the shell 100 is not limited in the present disclosure. For example, the shell 100 can have a rectangular structure. For example, the shell 100 can be a cell phone shell 100. For another example, the shell 100 can be the shell 100 in which the laptop screen is located.

Figure 14:
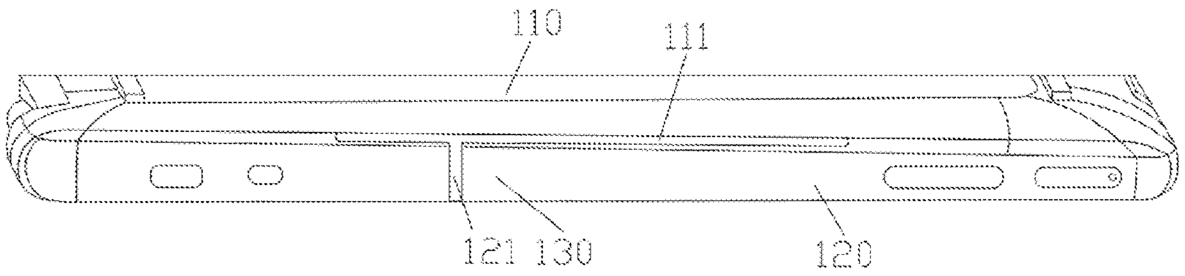
FIG. 14 illustrates a schematic local structural diagram of an electronic device according to some embodiments of the present disclosure.

In embodiments of the present disclosure, the structure of the first wall 120 is not limited. For example, as shown in FIG. 1, the first wall 120 can have a flat plate structure. For example, as shown in FIG. 14, the first wall 120 can have a curved plate structure.

The shape of the first opening 121 is not limited. For example, as shown in FIG. 1, the first opening 121 can have a strip structure. For example, the first opening 121 can have a rectangular structure. For example, the first opening 121 can have a strip structure, and the width of the first opening 121 can be 2 mm.

The method for at least a part of the first wall 120 located at the first opening 121 forming the first antenna radiator 130 is not limited.

For example, at least a part of the first wall 120 located at the first opening 121 can form the first antenna radiator 130 through a direct feeding method. Thus, at least a part of the first wall 120 located at the first opening 121 can have a first feed interface 171, and power can be supplied to the part of the first wall 120 located at the first opening 121 through the first feed interface 171.

For another example, the part of the first wall 120 located at the first opening 121 can form the first antenna radiator 130 by coupling. Thus, the electronic device can further include a third antenna radiator 140. The part of the first wall 120 located at the first opening 121 can form the first antenna radiator 130 by coupling with the third antenna radiator 140. A gap between the part of the first wall 120 located at the first opening 121 and the third antenna radiator 140 can satisfy a coupling condition.

In some embodiments, the part of the first wall 120 located at the first opening 121 can form a part of the first antenna radiator 130 through direct feeding. Another part of the first wall 120 located at the first opening 121 can form a part of the first antenna radiator 130 through coupling.

Figure 7:
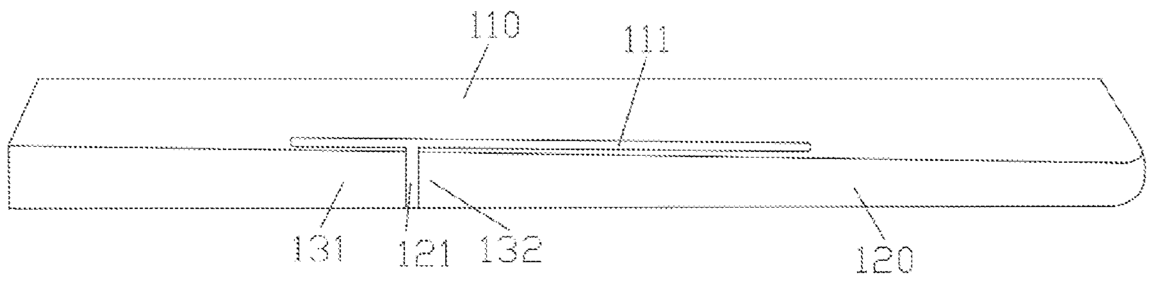
FIG. 7 illustrates a schematic local structural diagram of an electronic device according to some embodiments of the present disclosure.

The part of the first wall 120 located at the first opening 121 can be a wall on a side of the first opening 121 or walls on two sides of the first opening 121. For example, as shown in FIG. 7, a part of the first wall 120 located on a first side of the first opening 121 forms a first part 131 of the first antenna radiator, and a part of the first wall 120 located on a second side of the first opening 121 forms a second part 132 of the first antenna radiator. The first part 131 of the first antenna radiator can be formed through direct feeding or by coupling. The second part 132 of the first antenna radiator can be formed through direct feeding or by coupling. A formation method of the first part 131 of the first antenna radiator and a formation method of the second part 132 of the first antenna radiator can be the same or different. For example, the first part 131 of the first antenna radiator can be formed through coupling, and the second part 132 of the first antenna radiator can be formed through direct feeding. The direct feeding and coupling are described above, which are not repeated here.

In some embodiments of the present disclosure, the first wall 120 can include a first feed interface 171. A part of the first wall 120 located between the first feed interface 171 and the first opening 121 can form a part of the first antenna radiator 130. Thus, a part of the first wall 120 located between the first feed interface 171 and the first opening 121 can form a first open-circuit branch antenna member. A first part of the first wall 120 and the first opening 121 can be on opposite sides of the first feed interface 171. The first part of the first wall 120 can form a part of the first antenna radiator 130. Thus, the first part of the first wall 120 can form a second open-circuit branch antenna member. Thus, the part of the first wall 120 located at the first opening 121 can form the first antenna radiator 130 through direct feeding.

Figure 2A:
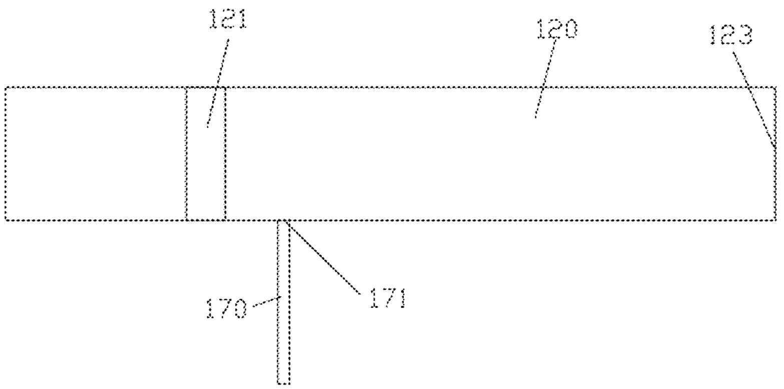
FIG. 2A and FIG. 2B illustrate schematic local structural diagrams of an electronic device according to some embodiments of the present disclosure.
Figure 3:
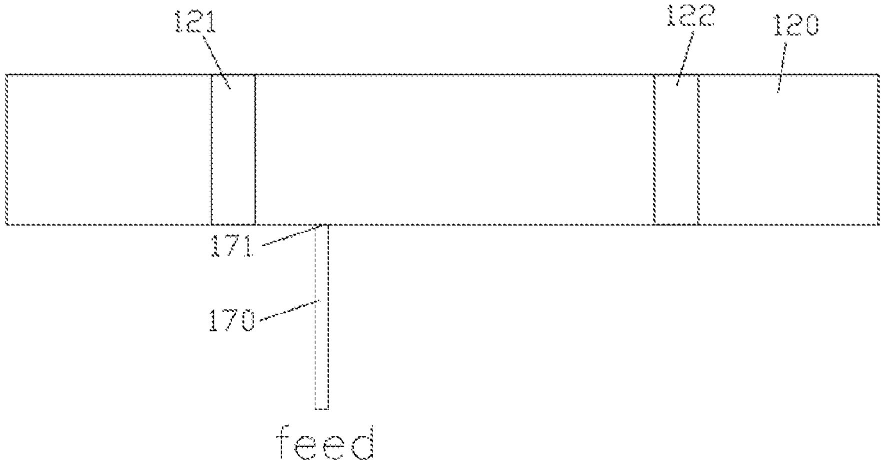
FIG. 3 illustrates a schematic local structural diagram of an electronic device according to some embodiments of the present disclosure.

In some embodiments, the first part of the first wall 120 is not limited. For example, as shown in FIG. 2A, the first part of the first wall 120 is the part of the first wall 120 between the first feed interface 171 and a first end 123 of the first wall 120. For example, as shown in FIG. 3, the first wall 120 includes a second opening 122. The second opening 122 is located on a side of the first feed interface 171 away from the first opening 121. The first part of the first wall 120 is the part of the first wall 120 between the second opening 122 and the first feed interface 171.

In some embodiments, the first feed interface 171 can refer to an interface connecting the first wall 120 to the first antenna feed wire 170.

Figure 4:
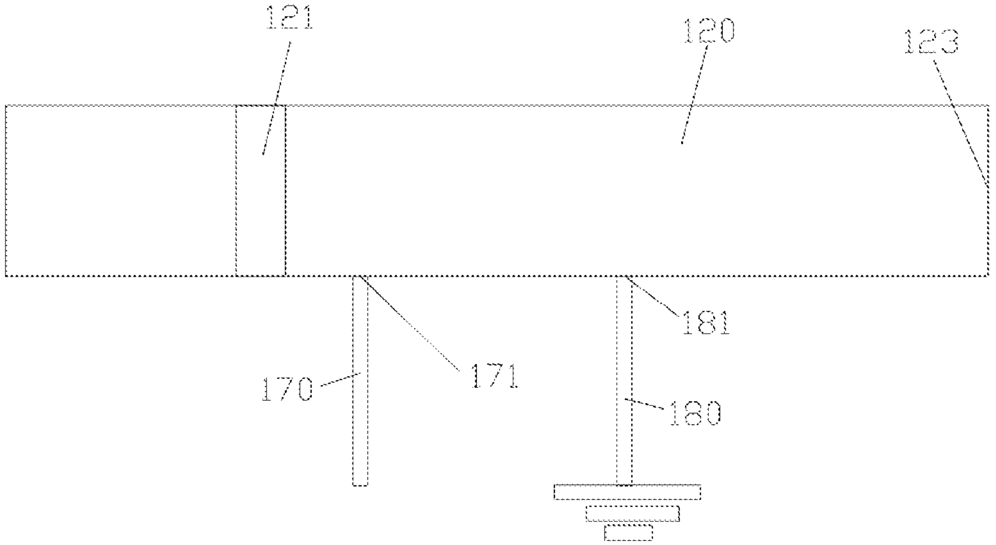
FIG. 4 illustrates a schematic local structural diagram of an electronic device according to some embodiments of the present disclosure.

In some embodiments, the first wall 170 can further include a ground interface 181. The ground interface 181 can be arranged on a side of the first feed interface 171 away from the first opening 121. The part of the first wall 120 located between the first feed interface 171 and the ground interface 181 can form the part of the first antenna radiator 130. Thus, the part of the first wall 120 located between the first feed interface 171 and the ground interface 181 can form a loop antenna member. As shown in FIG. 4, the ground interface 181 is an interface connecting the first wall 120 to a ground wire 180.

A distance between the ground interface 181 and the first opening 121 is not limited. For example, the distance between the ground interface 181 and the first opening 121 can be 22 mm. An antenna area with a length of 22 mm and a width of 2 mm can be formed between the ground interface 181 and the first opening 121.

Figure 5:
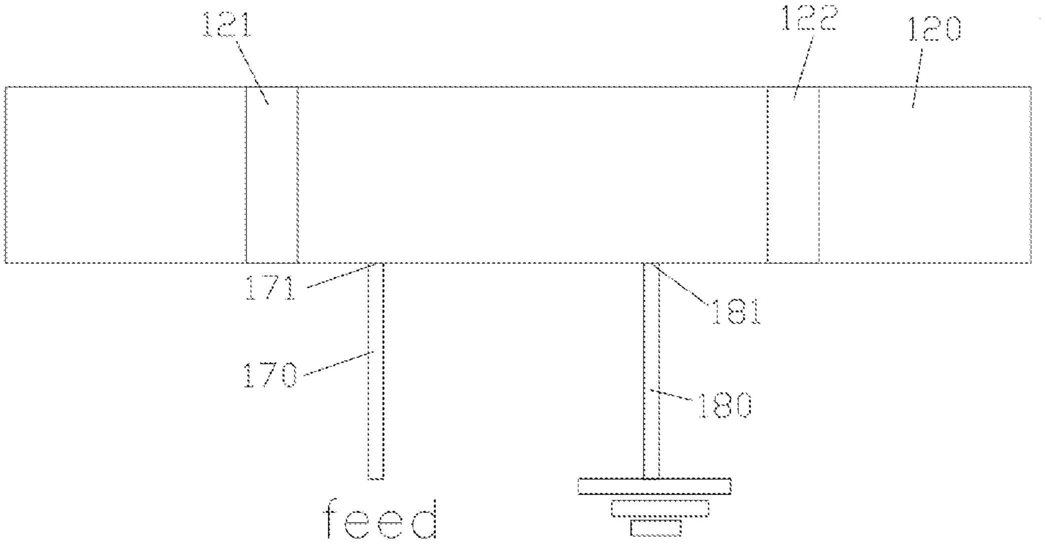
FIG. 5 illustrates a schematic local structural diagram of an electronic device according to some embodiments of the present disclosure.

As shown in FIG. 5, the first wall 120 includes the second opening 122. The ground interface 181 is between the first opening 121 and the second opening 122.

Figure 2B:
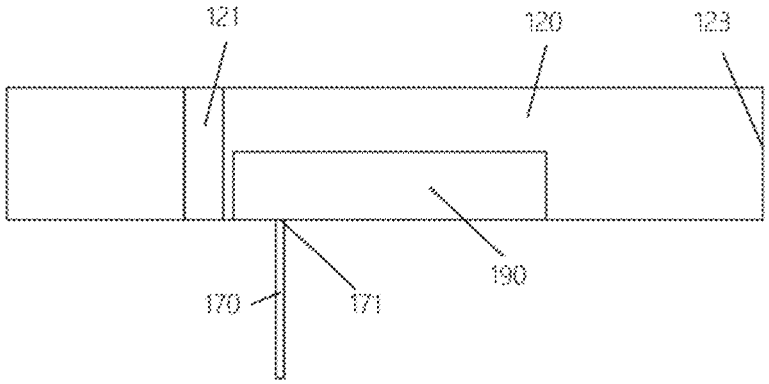

In some embodiments, the electronic device further includes a first antenna feed wire 170 and a second antenna radiator 190, as shown in FIG. 2B. The first antenna feed wire 170 is located in the accommodation space 101 and connected to the first feed interface 171. The first antenna feed wire 170 can be configured to supply power to the first feed interface 171. The second antenna radiator 190 can be connected to the first antenna feed wire 170 at a position close to the first feed interface 171. A coupling gap exists between the second antenna radiator 190 and the first wall 120. The first wall 120 and the second antenna radiator 190 can form a part of the first antenna radiator 130 through coupling. The second antenna radiator 190 can radiate through the first opening 121 or through the first opening 121 and the second opening 122. In some other embodiments, the second antenna radiator 190 can also radiate through the first opening 121 and the through-hole of the second wall 110 of the electronic device.

The first antenna feed wire 170 can be connected to the first wall 120 through a screw. A part of the first antenna feed wire 170 connected to the first wall 120 can be the first feed interface 171. The first antenna feed wire 170 can contact the first wall 120 through an elastic foot. Thus, the part of the elastic foot contacting the first wall 120 can be the first feed interface 171.

The second antenna radiator 190 can be an open-circuit branch antenna. The second antenna radiator 190 and the first wall 120 can cooperate to broaden the bandwidth of the antenna of the electronic device.

For example, as shown in FIG. 5, the first feed interface 171 is located between the first opening 121 and the second opening 122. The first open-circuit branch antenna member is formed between the first feed interface 171 and the first opening 121. The second open-circuit branch antenna member is formed between the first feed interface 171 and the second opening 122. The first wall 120 between the ground interface 181 and the first feed interface 171 can form a loop antenna member.

In some embodiments, as shown in FIG. 4, the first wall 120 only includes the first opening 121. Thus, the part of the first wall 120 between the first feed interface 171 and the first end 123 of the first wall 120 forms the second open-circuit branch antenna member.

In some embodiments, the first open-circuit branch antenna member can form a high-frequency 5G band wireless fidelity (WIFI) antenna. The second open-circuit branch antenna member and the loop antenna member can form a 2.4G band wireless antenna. The second antenna radiator 190 can cooperate with the first wall 120 to broaden the bandwidth of the electronic device to 7.125G(6E) to form a wireless antenna covering the entire frequency band.

Figure 8:
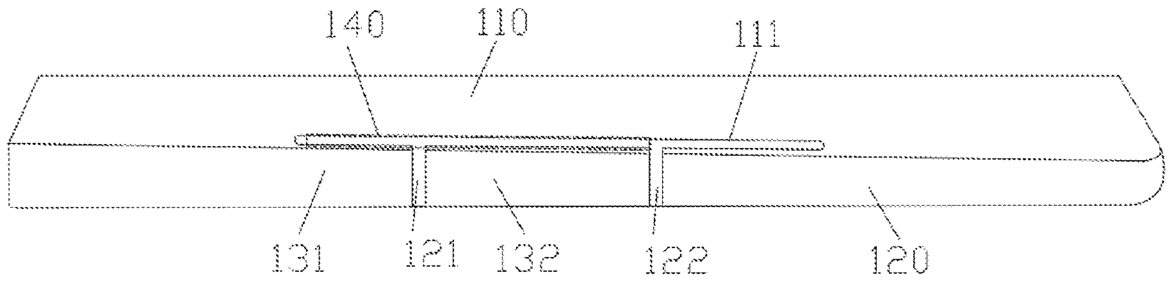
FIG. 8 illustrates a schematic local structural diagram of an electronic device according to some embodiments of the present disclosure.
Figure 9:
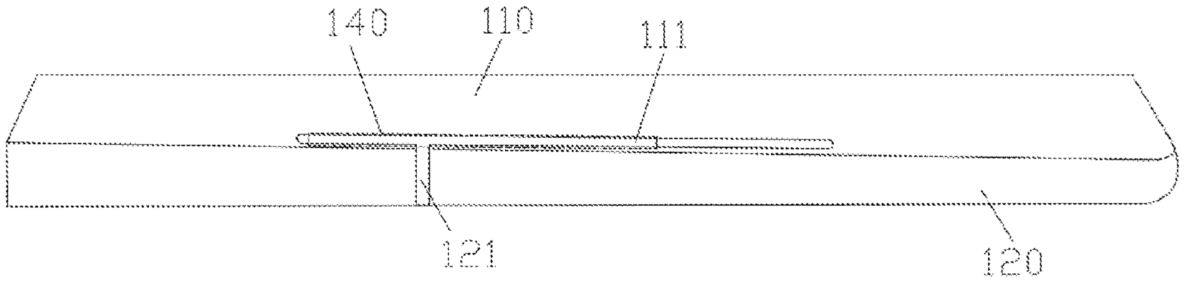
FIG. 9 illustrates a schematic local structural diagram of an electronic device according to some embodiments of the present disclosure.

In some embodiments of the present disclosure, as shown in FIG. 8 and FIG. 9, the electronic device further includes a second wall 110 and a third antenna radiator 140. The second wall 110 includes a through-hole 111 communicating with the accommodation space 101. The second wall 110 is connected to the first wall 120 to form a first angle. The third antenna radiator 140 is arranged in the accommodation space 101. The third antenna radiator 140 is arranged at the through-hole 111. The third antenna radiator 140 can radiate through the through-hole 111 and the first opening 121. Since the through-hole 111 and the first opening 121 are arranged at different walls of the shell 100, the radiation range of the third antenna radiator 140 can be increased. Thus, the third antenna radiator 140 can radiate from different sides to reduce field interference of the third antenna radiator 140 and improve the radiation efficiency of the third antenna radiator 140.

Figure 6:
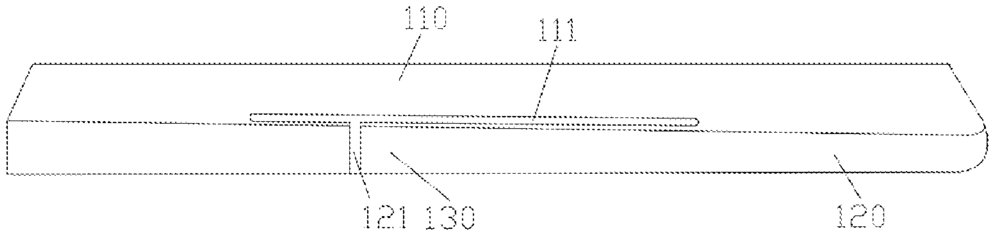
FIG. 6 illustrates a schematic local structural diagram of an electronic device according to some embodiments of the present disclosure.

In some embodiments, the structure of the second wall 110 is not limited. For example, as shown in FIG. 6, the second wall 110 has a flat plate structure. For example, as shown in FIG. 14, the second wall 110 has a curved plate structure.

Figure 11:
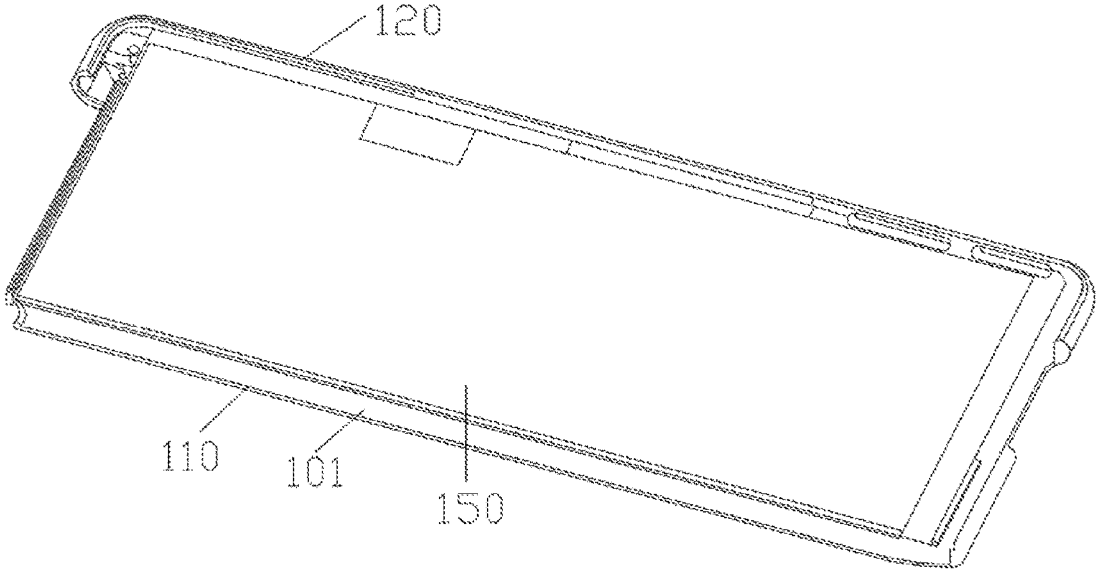
FIG. 11 illustrates a schematic local structural diagram of an electronic device according to some embodiments of the present disclosure.
Figure 12:
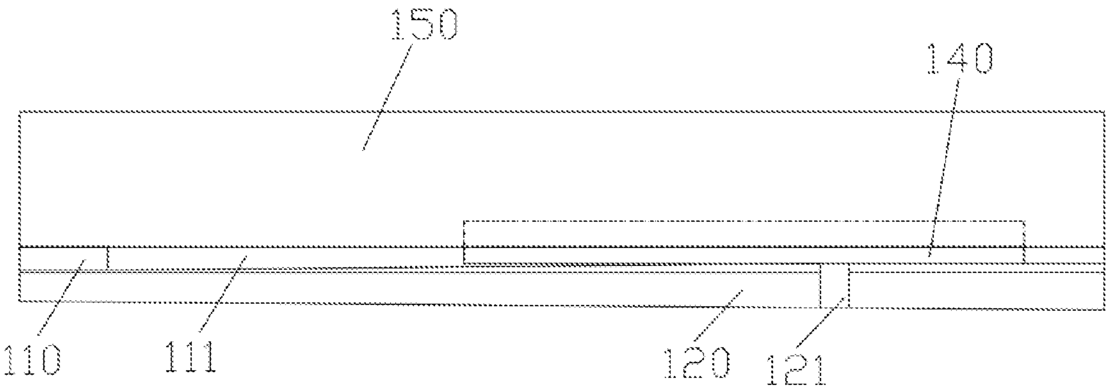
FIG. 12 illustrates a schematic local structural diagram of an electronic device according to some embodiments of the present disclosure.

The first wall 120 is connected to the second wall 120 to form a first angle. A value of the first angle is not limited. For example, the first angle can be 90 degrees. For example, the second wall 110 can be a bottom wall, and the first wall 120 can be a sidewall. For another example, as shown in FIG. 11 and FIG. 12, the shell 100 further includes a third wall 150. The third wall 150 is arranged opposite the second wall 110. A display screen is arranged in the middle of the third wall 150. The third wall 150 is connected to the first wall 120. The third antenna radiator 140 is arranged between a side member of the third wall 150 and the second wall 110. That is, the third antenna radiator 140 is arranged within the border of the third wall 150. Thus, the third antenna radiator 140 and the display screen are staggered in a thickness direction of the electronic device. The third antenna radiator 140 does not occupy the middle space of the accommodation space 101, which leaves the electronic device with more space. Thus, the electronic device can be flexible for a stacking design.

Figure 13:
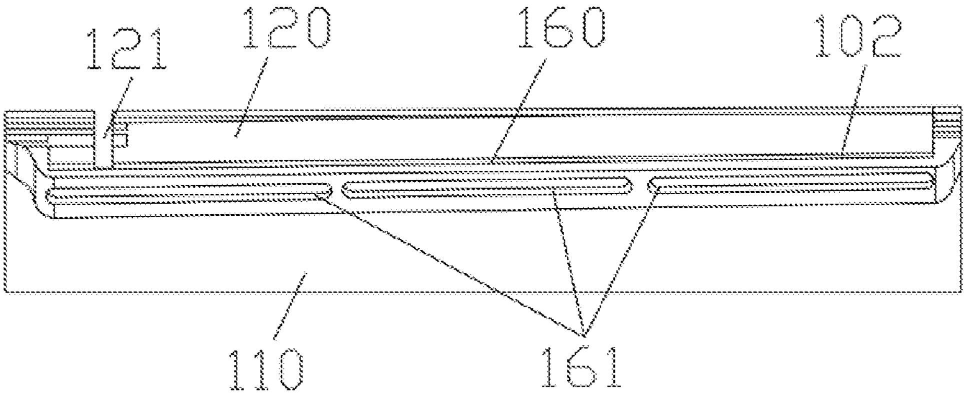
FIG. 13 illustrates a schematic local structural diagram of an electronic device according to some embodiments of the present disclosure.

For another example, as shown in FIG. 13, the shell 100 also includes a fourth wall 160. The fourth wall 160 is located in the accommodation space 101. The fourth wall 160 is connected to the second wall 110 at the through-hole 111. The fourth wall 160 is spaced apart from the first wall 120 to form a first part 102 of the accommodation space. A cross-sectional shape of the first part 102 of the accommodation space can be the same or substantially the same as a cross-sectional shape of the through-hole 111. That is, the first part 102 of the accommodation space has a strip-shaped space, and the third antenna radiator 140 can be located in the first part 102 of the accommodation space. The through-hole 111 can be covered by the fourth wall 160 to prevent the structure in the accommodation space 101 from being exposed through the through-hole 111. Thus. The shell 100 further includes a slot 161. The slot 161 is arranged at the fourth wall 160. The slot 161 can communicate with the first part 102 of the accommodation space and the second part of the accommodation space 101. Thus, a communication area of the through-hole 111 and the second part of the accommodation space 101 can be increased. A number of slots 161 is not limited. For example, as shown in FIG. 13, three slots 161 are arranged at the fourth wall 160 at intervals.

The shape of the through-hole 111 is not limited. For example, as shown in FIG. 6 and FIG. 7, the through-hole 111 has a strip-shaped structure. For another example, the through-hole 111 can have a circular structure. For example, the through-hole 111 can have a strip-shaped structure with a length of 65 mm and a width of 2 mm.

As shown in FIG. 6 and FIG. 7, the through-hole 111 communicates with the first opening 121. However, the through-hole 111 may not communicate with the first opening 121.

The through-hole 111 can be a hole formed at the electronic device for the third antenna radiator 140 or a pre-existing hole at the electronic device. For example, the through-hole 111 can be an air inlet or an air outlet. Thus, the through-hole 111 can be configured for ventilation and antenna radiation. A hole structure may not additionally be needed for the antenna radiation, which greatly simplifies the structure of the electronic device. In some embodiments, the through-hole 111 can also be a microphone hole or a loudspeaker hole.

The number of the through-holes 111 is not limited. For example, the second wall 110 can include two through-holes 111 communicating with the accommodation space 101. The two through-holes 111 can be arranged on opposite sides of the second wall 110. The electronic device can also include two third antenna radiators 140. The two third antenna radiators 140 can be correspondingly arranged at the two through-holes 111. One of the two third antenna radiators 140 can be arranged at one of the two through-holes 111. The other one of the two third antenna radiators 140 can be arranged at the other one of the two through-holes 111. Thus, the overall throughput of the antenna of the electronic device can be increased, and the communication capability and stability of the antenna of the electronic device can be improved. The two third antenna radiators 140 can be mirrored and designed.

In some embodiments, the structure of the third antenna radiator 140 is not limited. For example, the third antenna radiator 140 can be an open-circuit antenna.

In some embodiments, the third antenna radiator 140 and the first antenna radiator 130 can be separate antenna radiators that do not interfere with each other. Thus, the first antenna radiator 130 can be formed through the first feed interface 171 above. In some other embodiments, the first antenna radiator 130 can be formed through the coupling with the third antenna radiator 140.

For example, a coupling gap can exist between the third antenna radiator 140 and the first part of the first wall 120 at the first opening 121. The first part of the first wall 120 at the first opening 121 can form at least a part of the first antenna radiator 130 through coupling.

For example, the third antenna radiator 140 can include a second feed interface 141. A part from the second feed interface 141 to the first end of the third antenna radiator 140 can form a fourth open-circuit branch antenna member. A part from the second feed interface 141 to the second end of the third antenna radiator 140 can form a fifth open-circuit branch antenna member. The fourth open-circuit branch antenna member and the first part of the first wall at the first opening 121 can form at least a part of the first antenna radiator 130 through coupling. The fifth open-circuit branch antenna member and the second part of the first wall 120 at the first opening 121 can form a part of the first antenna radiator 130 through coupling. The second feed interface 141 can be connected to the second antenna feed wire.

The first antenna radiator 130 can also be formed through the first feed interface 171 or through the coupling with the third antenna radiator 140. For example, as shown in FIG. 8, the fourth open-circuit branch antenna member and the first part of the first wall 120 at the first opening 121 can form the first part 131 of the first antenna radiator through coupling. The second part of the first wall 120 at the first opening 121 can form the second part 132 of the first antenna radiator through direct feeding.

Figure 10:
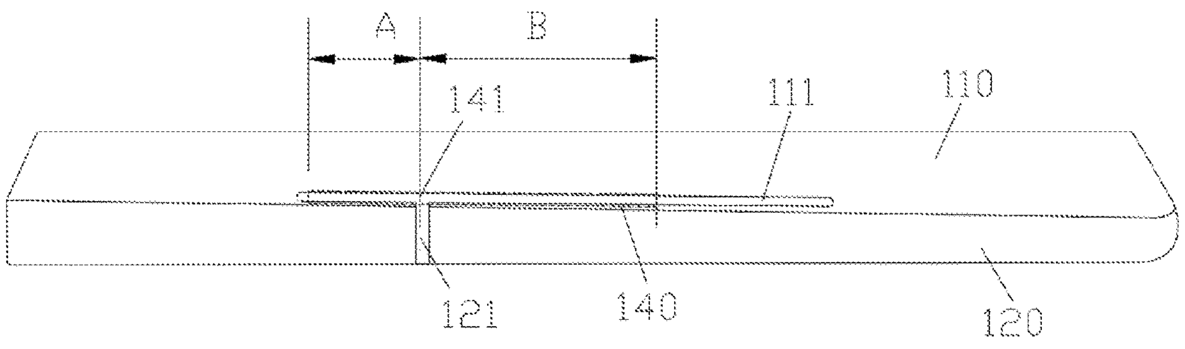
FIG. 10 illustrates a schematic local structural diagram of an electronic device according to some embodiments of the present disclosure.

In some embodiments, as shown in FIG. 10, the length of the through-hole 111 is 65 mm, and the width of the through-hole 111 is 2 mm. The length of the third antenna radiator 140 is 26 mm, and the width of the third antenna radiator 140 is 3 mm. The length from the second feed interface 141 to the first end of the third antenna radiator 140 is A, which is 7.5 mm, to form the fourth open-circuit branch antenna member. The fourth open-circuit branch member can form a wireless antenna generating a 2.4 G frequency band. The length from the second feed interface 141 to the second end of the third antenna radiator 140 is B, which is 18.5 mm, to form the fifth open-circuit branch antenna member. The fifth open-circuit branch antenna member can form a wireless antenna generating a 5G frequency band. Meanwhile, the first part of the first wall 120 at the first opening 121 and the fourth open-circuit frequency band wireless antenna can be coupled to form a part of the first antenna radiator 130. The second part of the first wall 120 at the first opening 121 and the fifth open-circuit frequency band wireless antenna can be coupled to form a part of the first antenna radiator 130. Thus, the fourth open-circuit frequency band wireless antenna, the fifth open-circuit frequency band wireless antenna, and the first antenna radiator 130 can cooperate with each other to broaden the bandwidth of the electronic device to 7.125 GHz (6E).

A coupling gap can exist between the third antenna radiator 140 and the second wall 110. A portion of the second wall 110 can also form an antenna radiator through coupling. The first wall 120 and the second wall 110 can be coupled with the third antenna radiator 140 to form an antenna radiator to broaden the bandwidth of the electronic device.

The electronic device of embodiments of the present disclosure can include the shell 100. The shell 100 can form the accommodation space 101. The shell 100 can include the first wall 120. The first wall 120 can include the first opening 121 communicating with the accommodation space 101. At least a part of the first wall 120 located at the first opening 121 can form the first antenna radiator 130 of the electronic device. Thus, the first antenna radiator 120 of the electronic device can be formed through the first wall 120 of the shell 100. The first antenna radiator 130 may not need to be arranged separately. Thus, the structure of the electronic device for arranging the first antenna radiator 130 can be greatly simplified, which improves the adaptability of the electronic device.

The above are merely some embodiments of the present disclosure. However, the scope of the present disclosure is not limited to this. Those skilled in the art can easily think of modifications or replacements within the scope of the present disclosure. Thus, these modifications and replacements should be within the scope of the present disclosure. Therefore, the scope of the present disclosure is subject to the scope of the claims.

What is claimed is:

1. An electronic device comprising:

a shell forming an accommodation space and including:

a first wall including a first opening communicating with the accommodation space;

wherein a first part of the first wall located on a first side of the first opening forms a first part of a first antenna radiator of the electronic device, and a second part of the first wall located on a second side of the first opening forms a second part of the first antenna radiator of the electronic device.

2. The electronic device according to claim 1, wherein:

the first wall includes a first feed interface and the second part of the first wall further includes:

a third part of the first wall located between the first feed interface and the first opening, forming a part of the first antenna radiator;

a fourth part of the first wall located on a side of the first feed interface away from the first opening, the fourth part of the first wall forming a part of the first antenna radiator.

3. The electronic device according to claim 2, wherein:

the fourth part of the first wall is a part of the first wall between the first feed interface and a first end of the first wall.

4. The electronic device according to claim 2, wherein the first wall further includes:

a ground interface arranged on a side of the first feed interface away from the first opening, and a part of the first wall between the first feed interface and the ground port forming a part of the first antenna radiator.

5. The electronic device according to claim 2, further comprising:

a first antenna feed wire arranged in the accommodation space and connected to the first feed interface; and a second antenna radiator connected to the first antenna feed wire at a position close to the first feed interface and having a coupling gap with the first wall;

wherein the first wall and the second antenna radiator form a part of the first antenna radiator through coupling.

6. The electronic device according to claim 2, wherein:

the first wall further includes a second opening arranged on a side of the first feed interface away from the first opening, and the fourth part of the first wall is a part of the first wall between the second opening and the first feed interface.

7. The electronic device according to claim 1, further comprising:
a second wall including a through-hole communicating with the accommodation space and connected to the first wall to form a first angle with the first wall; and
a third antenna radiator arranged in the accommodation space, located at the through-hole, and being capable of radiating through the through-hole and the first opening.
8. The electronic device according to claim 7, wherein:
the third antenna radiator and a fifth part of the first wall at the first opening have a coupling gap; and
the fifth part of the first wall located at the first opening forms a part of the first antenna radiator through coupling.
9. The electronic device according to claim 8, wherein:
the through-hole is an air inlet or an air outlet; and
the second wall includes two through-holes communicating with the accommodation space and arranged on opposite sides of the second wall;
the electronic device further comprising:
two third antenna radiators arranged at the two through-holes, correspondingly.
10. The electronic device according to claim 8, wherein a sixth part of the first wall located at the first opening forms a part of the first antenna radiator through direct feeding.
11. The electronic device according to claim 7, wherein:
the second wall is a bottom wall;
the first wall is a sidewall; and
the shell further includes:
a third wall arranged opposite to the second wall, including a screen in middle of third wall, and connected to the first wall, the third antenna radiator being located between an edge of the third wall and the second wall;
a fourth wall arranged in the accommodation space, connected to the second wall at the through-hole, and spaced apart from the first wall to form a first part of the accommodation space, the third antenna radiator being located at the first part of the accommodation; and
a slot arranged at the fourth wall and communicating with the first part and a second part of the accommodation space.
12. The electronic device according to claim 11, wherein:
the through-hole is an air inlet or an air outlet; and
the second wall includes two through-holes communicating with the accommodation space and arranged on opposite sides of the second wall;
the electronic device further comprising:
two third antenna radiators arranged at the two through-holes, correspondingly.
13. The electronic device according to claim 7, wherein:
the through-hole is an air inlet or an air outlet; and
the second wall includes two through-holes communicating with the accommodation space and arranged on opposite sides of the second wall;
the electronic device further comprising:
two third antenna radiators arranged at the two through-holes, correspondingly.
14. An electronic device comprising:
a shell forming an accommodation space and including:
a first wall including a first opening communicating with the accommodation space, wherein at least a part of the first wall located at the first opening forms a first antenna radiator of the electronic device;
a second wall including a through-hole communicating with the accommodation space and connected to the first wall to form a first angle with the first wall; and
a third antenna radiator arranged in the accommodation space, located at the through-hole, and being capable of radiating through the through-hole and the first opening.
15. The electronic device according to claim 14, wherein:
the third antenna radiator and a first part of the first wall at the first opening have a coupling gap; and
the first part of the first wall located at the first opening forms a part of the first antenna radiator through coupling.
16. The electronic device according to claim 15, wherein:
the through-hole is an air inlet or an air outlet; and
the second wall includes two through-holes communicating with the accommodation space and arranged on opposite sides of the second wall;
the electronic device further comprising:
two third antenna radiators arranged at the two through-holes, correspondingly.
17. The electronic device according to claim 15, wherein a second part of the first wall located at the first opening forms a part of the first antenna radiator through direct feeding.
18. The electronic device according to claim 14, wherein:
the second wall is a bottom wall;
the first wall is a sidewall; and
the shell further includes:
a third wall arranged opposite to the second wall, including a screen in middle of third wall, and connected to the first wall, the third antenna radiator being located between an edge of the third wall and the second wall;
a fourth wall arranged in the accommodation space, connected to the second wall at the through-hole, and spaced apart from the first wall to form a first part of the accommodation space, the third antenna radiator being located at the first part of the accommodation; and
a slot arranged at the fourth wall and communicating with the first part and a second part of the accommodation space.
19. The electronic device according to claim 18, wherein:
the through-hole is an air inlet or an air outlet; and
the second wall includes two through-holes communicating with the accommodation space and arranged on opposite sides of the second wall;
the electronic device further comprising:
two third antenna radiators arranged at the two through-holes, correspondingly.
20. The electronic device according to claim 14, wherein:
the through-hole is an air inlet or an air outlet; and
the second wall includes two through-holes communicating with the accommodation space and arranged on opposite sides of the second wall;
the electronic device further comprising:
two third antenna radiators arranged at the two through-holes, correspondingly.

* * * * *